US012094667B2

(12) United States Patent
Burke et al.

(10) Patent No.: US 12,094,667 B2
(45) Date of Patent: Sep. 17, 2024

(54) DIGITAL SIGNALING DEVICE FOR SIGNALING AN ELECTRICAL SWITCH

(71) Applicant: RENU, INC., Carrollton, TX (US)

(72) Inventors: Sean Burke, Morgan Hill, CA (US); Brian Reeves, Hamilton (CA); Charles Edward Becze, Oakville (CA); Yong Miao, Mississauga (CA); Sanjiv Sirpal, Oakville (CA); David Hull, Seattle, WA (US); David Taylor, Brampton (CA); Paul Edward Reeves, Oakville (CA); Guli Meng, Mississauga (CA); David Reeves, Burlington (CA); Mike Uhl, Seattle, WA (US)

(73) Assignee: ONX, Inc., Carrollton, TX (US)

( * ) Notice: Subject to any disclaimer, the term of this patent is extended or adjusted under 35 U.S.C. 154(b) by 0 days.

(21) Appl. No.: 18/369,647

(22) Filed: Sep. 18, 2023

(65) Prior Publication Data

US 2024/0006136 A1 Jan. 4, 2024

Related U.S. Application Data

(63) Continuation of application No. 16/791,812, filed on Feb. 14, 2020, now abandoned.

(Continued)

(51) Int. Cl.

| | |
|---|---|
| ***H01H 23/24*** | (2006.01) |
| ***H01H 23/00*** | (2006.01) |
| ***H01H 23/20*** | (2006.01) |

(52) U.S. Cl.

CPC ........ *H01H 23/205* (2013.01); *H01H 23/006* (2013.01); *H01H 23/24* (2013.01)

(58) Field of Classification Search

CPC .... H01H 23/143; H01H 23/30; H01H 23/025; H01H 2300/03; H01H 23/145;

(Continued)

(56) References Cited

U.S. PATENT DOCUMENTS 3,265,826 A * 8/1966 Autry ................ H01H 36/0006 335/206
3,313,073 A 4/1967 Mathews (Continued)

FOREIGN PATENT DOCUMENTS

CN 104465638 3/2015
CN 106348709 A 1/2017

(Continued)

OTHER PUBLICATIONS

"4 Elements of Soundproofing", www.soundproofingcompany.com 10 pages.

(Continued)

*Primary Examiner* — Ahmed M Saeed

(74) *Attorney, Agent, or Firm* — Haverstock & Owens, A Law Corporation

(57) ABSTRACT

A digital signaling device provides visual, audible, and haptic indicators when the digital signaling device changes state. The digital signaling device has a same operational feel and response as a classic electro-mechanical decorator-style light switch, including maintaining switch paddle position, using attractive magnetic latching in combination with a spring contact. The switch paddle can be pressed into one of two positions, each position representing a different state of the digital signaling device. The switch paddle provides a visual indicator of the digital signaling device state in that the switch paddle is maintained in one of the two positions. The attractive magnetic latching provides both an audible and haptic indicator when the magnet pairs are (Continued)

engaged, which corresponds to a change of state of the digital signaling device. The spring contact provides a digital switching mechanism for changing the state of the digital signaling device.

20 Claims, 4 Drawing Sheets

Related U.S. Application Data

(60) Provisional application No. 62/806,255, filed on Feb. 15, 2019.

(58) Field of Classification Search
CPC .. H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26
See application file for complete search history.

(56) References Cited

U.S. PATENT DOCUMENTS

| | | | | |
|---|---|---|---|---|
| 3,460,281 | A | 8/1969 | Levy | |
| 3,765,543 | A | 10/1973 | Thomas | |
| 3,974,607 | A | 8/1976 | Balinki | |
| 3,992,839 | A | 11/1976 | LaBorde | |
| 4,285,184 | A | 8/1981 | Turner, Jr. | |
| 5,040,345 | A | 8/1991 | Gilmour | |
| 5,313,752 | A | 5/1994 | Hatzinikolas | |
| 5,559,311 | A * | 9/1996 | Gorbatoff | H01H 13/70 200/1 B |
| 5,685,113 | A | 11/1997 | Reuter | |
| 5,689,922 | A | 11/1997 | Daudet | |
| 5,706,620 | A | 1/1998 | DeZen | |
| 5,996,296 | A | 12/1999 | Bisbee | |
| 6,015,026 | A | 1/2000 | McGrath | |
| 6,118,676 | A | 9/2000 | Divan | |
| 6,122,867 | A | 9/2000 | Leconte | |
| 6,189,269 | B1 | 2/2001 | DeZen | |
| 6,371,637 | B1 | 4/2002 | Atchinson | |
| 6,426,632 | B1 | 7/2002 | Clunn | |
| 6,430,881 | B1 | 8/2002 | Daudet | |
| 6,647,691 | B2 | 11/2003 | Becker | |
| 6,658,808 | B1 | 12/2003 | Doherty | |
| 7,197,853 | B1 | 4/2007 | Little, Jr. | |
| 7,596,924 | B2 | 10/2009 | Sakae | |
| 7,614,199 | B2 | 11/2009 | Smalley, III | |
| 7,665,257 | B2 | 2/2010 | Posey | |
| 7,677,009 | B2 | 3/2010 | Bowman | |
| 7,703,248 | B2 | 4/2010 | Dincel | |
| 7,752,817 | B2 | 7/2010 | Pilz | |
| 8,347,560 | B2 | 1/2013 | Gyory | |
| 8,413,394 | B2 | 4/2013 | Pilz | |
| 8,424,251 | B1 | 4/2013 | Tinianov | |
| 8,555,566 | B2 | 10/2013 | Pilz | |
| 8,677,713 | B1 | 3/2014 | Sheehy | |
| 9,007,745 | B1 | 4/2015 | Flegel | |
| 9,627,863 | B1 | 4/2017 | Harrison | |
| 10,041,243 | B2 | 8/2018 | Walker | |
| 10,227,785 | B2 | 3/2019 | McCaffrey | |
| 10,619,347 | B2 | 4/2020 | Pilz | |
| D888,286 | S | 6/2020 | Spear | |
| 10,752,551 | B2 | 8/2020 | Wilde | |
| 10,961,710 | B2 | 3/2021 | Collins et al. | |
| 11,313,121 | B2 | 4/2022 | Quirijiins | |
| 11,560,712 | B2 | 1/2023 | Pilz | |
| 2001/0023792 | A1 | 9/2001 | Noselli | |
| 2002/0020120 | A1 | 2/2002 | McKenzie | |
| 2003/0196401 | A1 | 10/2003 | Surowiecki | |
| 2004/0007981 | A1 | 1/2004 | Shibata | |
| 2007/0056245 | A1 | 3/2007 | Edmondson | |
| 2008/0053016 | A1 | 3/2008 | Kang | |
| 2008/0229696 | A1 | 9/2008 | Benson | |
| 2009/0051557 | A1 | 2/2009 | Beatty | |
| 2010/0058686 | A1 | 3/2010 | Henriquez | |
| 2010/0141153 | A1 | 6/2010 | Recker | |
| 2011/0227489 | A1 | 9/2011 | Huynh | |
| 2012/0162965 | A1 | 6/2012 | Takeuchi | |
| 2012/0299489 | A1 | 11/2012 | Sakuragi | |
| 2013/0019549 | A1 | 1/2013 | Henriguez | |
| 2013/0205694 | A1 | 8/2013 | Stahl, Jr. | |
| 2014/0175996 | A1 | 6/2014 | Yoon | |
| 2015/0043212 | A1 | 2/2015 | Coffey | |
| 2015/0275521 | A1 | 10/2015 | Bader et al. | |
| 2015/0368898 | A1 | 12/2015 | Stahl, Jr. | |
| 2016/0217957 | A1 | 7/2016 | Kumar | |
| 2016/0241002 | A1 | 8/2016 | Tremaine | |
| 2016/0034137 | A1 | 11/2016 | Dekker | |
| 2017/0063051 | A1 | 3/2017 | Sharp | |
| 2017/0089763 | A1 | 3/2017 | Freer | |
| 2017/0138542 | A1 | 5/2017 | Gielen | |
| 2017/0154744 | A1 * | 6/2017 | Hanson | H01H 9/26 |
| 2017/0169979 | A1 | 6/2017 | Mittelstadt | |
| 2017/0342736 | A1 | 11/2017 | Roshinsky | |
| 2018/0038103 | A1 | 2/2018 | Newmayr | |
| 2018/0363893 | A1 | 12/2018 | Cheng | |
| 2019/0006827 | A1 | 1/2019 | Gintz | |
| 2019/0089146 | A1 | 3/2019 | Li | |
| 2019/0120438 | A1 | 4/2019 | Wan | |
| 2019/0166661 | A1 | 5/2019 | Gao | |
| 2019/0245335 | A1 | 8/2019 | McKenny | |
| 2019/0316350 | A1 | 10/2019 | Pilz | |
| 2020/0119551 | A1 | 4/2020 | Saylor | |
| 2022/0037861 | A1 | 2/2022 | McKimmey | |

FOREIGN PATENT DOCUMENTS

| | | | |
|---|---|---|---|
| EP | 2314771 | A2 | 4/2011 |
| GB | 2554506 | A | 4/2018 |
| JP | 2003293474 | A | 10/2003 |
| WO | 2013182587 | A1 | 12/2013 |
| WO | 20200014732 | A1 | 1/2020 |

OTHER PUBLICATIONS

"Decoupling Explained", www.tmsoundproofing.com/decoupling-explained.html, 14 pages.
"Development of Lightweight Concrete Subfloor with Ethylene Vinyl Acetate (EVA) Aggregates Waste to Reduce Impact Sound Inflooring System", http://dyna.medellin.unal.edu.com, by Fernanda Pacheco et al. pp. 290-295.
Cambridge Sound Management, "Explaining the Speech Privacy Potential Rating", 3 pages.
"How to Soundproof A Wall", www.bobvilla.com/articles/how-to-soundproof-a-wall/, By: Steffani Cameron & Bob Villa, Sep. 24, 2021, 8 pages.
"Noise Isolation Class", https://asastandards.org/Terms/noise-isolation-class/, 3 pages.
"Perforated Panel Absorbers vs Diaphragmatic Absorbers", By Dennis Foley, May 19, 2013, 14 pages.
"Speech Privacy Class for Rating the Speech Privacy of Meeting rooms", By John S. Bradley and Bradford N. Gover, vol. 36., No. 3, (2008), pp. 22-23.
Non-Final Office Action mailed on Feb. 25, 2020, U.S. Appl. No. 16/250,727, filed Jan. 17, 2019, applicant Juntao Zhang, 21 pages.
Notice of Allowance dated Jun. 11, 2019, U.S. Appl. No. 16/197,003, filed Jan. 20, 2018, Applicant: Shanfu Gao, 15 pages.
International Search Report mailed May 18, 2022, in International Application No. PCT/US22/17555, 23 pages.
International Search Report, mailed May 16, 2023, in International Application No. PCT/US 22/53216, 16 pages.
Design U.S. Appl. No. 29/7273629 for McKimmey publication US 20220037861 A1, (Year 2022).

* cited by examiner

DIGITAL SIGNALING DEVICE FOR SIGNALING AN ELECTRICAL SWITCH

RELATED APPLICATIONS

This patent application is a continuation of the co-pending U.S. patent application Ser. No. 16/791,812, filed Feb. 14, 2020, and titled "Digital Signaling Device for Signaling an Electrical Switch, which claims priority under 35 U.S.C. 119(e) of U.S. provisional patent application, Application Ser. No. 62/806,255, filed on Feb. 15, 2019, and entitled "Wireless Light Switch Actuator and Magnetics", both of which are hereby incorporated by reference in their entireties.

FIELD OF THE INVENTION

The present invention is generally directed to electrical switches. More specifically, the present invention is directed to a digital signaling device for signaling an electrical switch.

BACKGROUND OF THE INVENTION

Digital light switches, that is, switches which utilize a digital switching mechanism rather than an analogue electro-mechanical interruption of a physical electrical line, often have a different operational feel to analogue light switches. Digital light switches are often push button based, that actuate a printed circuit board assembly (PCBA) mounted dome switch. Digital light switches which are paddle-based, for example a decorator-type paddle, are often momentary rockers, which do not maintain paddle position; that is, the paddle does not stay in an up or down state, which is usually a visible indicator of the state of the electrical fixture which the switch operates. Digital light switches do not replicate the user operation of a traditional electro-mechanical light switch.

Finger force characteristics of digital dome switches have increasing resistance until enough pressure has developed to actuate the switch. Finger force characteristics of a traditional electro-mechanical light switch provides up-front initial resistance, followed by decreasing finger resistance through the toggle where the mechanism itself completes the operation. The latter half of the rotation has the toggle "snapping" as it auto-completes the operation.

Decorator-style digital wall switches keep state using repulsive magnets and dome switch contacts. The user operability of such a switch is that of a dome switch. The toggle of the paddle is the first stage, which then requires the user to follow through and engage a dome switch. The toggle of the paddle itself is faux and does not engage the change of state.

SUMMARY OF THE INVENTION

Embodiments are directed to a digital signaling device that provides signaling for an electrical switch to change state. The electrical switch is part of an electrical circuit that includes one or more electrical fixtures, such as a light, a fan, an electrical outlet, etc. The electrical switch directly engages and disengages the electrical circuit, whereas the digital signaling device does not. Instead, the digital signaling device indirectly engages and disengages the electrical circuit by functioning as a user interface to change a state of the electrical switch, and in response to a user input provides control signaling to the electrical switch. The electrical switch includes, or is connected to, a receiving electrical control device that receives the control signaling provided by the digital signaling device and correspondingly controls the electrical switch to modulate electrical output within or upstream of the connected one or more electrical fixtures.

The digital signaling device is configured to provide visual, audible, and haptic indicators when the digital signaling device changes state, and therefore when the corresponding digital switch changes state, for example turns ON or OFF. The digital signaling device has a same operational feel and response as a classic electro-mechanical decorator-style light switch, including maintaining switch paddle position, using attractive magnetic latching in combination with a spring contact. The switch paddle can be pressed into one of two positions, each position representing a different state of the digital signaling device. The switch paddle provides a visual indicator of the digital signaling device state in that the switch paddle is maintained in one of the two positions. The attractive magnetic latching provides both an audible and haptic indicator when the magnet pairs are engaged, which corresponds to a change of state of the digital signaling device. The spring contact provides a digital switching mechanism for changing the state of the digital signaling device. In some embodiments, the digital signaling device is a wireless digital signaling device paired with a wireless receiving electrical control device of an electrical switch.

In an aspect, a digital signaling device comprises a switch paddle, a first magnet pair, a second magnet pair, a first force spring, a second force spring, and a printed circuit board assembly. The switch paddle comprises a first portion and a second portion, wherein the switch paddle is rotatable between a first position and a second position. The first magnet pair comprises a first receiving magnet fixed in position and a first paddle magnet attached to the first portion of the switch paddle, wherein when the switch paddle rotates to the first position, the first receiving magnet engages with the first paddle magnet with a first audible indicator and a first haptic indicator, and the switch paddle maintains the first position. The second magnet pair comprises a second receiving magnet fixed in position and a second paddle magnet attached to the second portion of the switch paddle, wherein when the switch paddle rotates to the second position, the second receiving magnet engages with the second paddle magnet with a second audible indicator and a second haptic indicator, and the switch paddle maintains the second position. The first force spring is coupled to the first portion of the switch paddle. The second force spring is coupled to the second portion of the switch paddle. The printed circuit board assembly comprises a printed circuit board assembly controller, a first printed circuit board assembly contact, and a second printed circuit board assembly contact. The first printed circuit board assembly contact and the first force spring form a first digital switching mechanism that are engaged when the switch paddle is in the first position and when engaged signal the printed circuit board assembly controller of a first change of state of the digital signaling device. The second printed circuit board assembly contact and the second force spring form a second digital switching mechanism that are engaged when the switch paddle is in the first position and when engaged signal the printed circuit board assembly controller of a second change of state of the digital signaling device. In some embodiments, the first position of the switch paddle provides a first visual indicator of a state of the digital switch, and the second position of the switch paddle provides a second visual indicator of another state of the digital switch. In some embodiments, the first printed circuit board assembly contact comprises a first printed circuit board assembly dome switch, and the second printed circuit board assembly contact comprises a second printed circuit board assembly dome switch. In some embodiments, when the switch paddle is in the first position, the second receiving magnet and the second paddle magnet are disengaged, and the second force spring and the second printed circuit board assembly contact are disengaged. In some embodiments, when the switch paddle is in the second position, the first receiving magnet and the first paddle magnet are disengaged, and the first force spring and the first printed circuit board assembly contact are disengaged. In some embodiments, the digital switch is powered by one or more batteries, a wired connection to a power source, or an energy harvesting device. In some embodiments, the digital signaling device is part of a N-way switching system for controlling the electrical fixture, further wherein the N-way switching system further comprises one or more additional digital signaling devices, wherein the printed circuit board assembly controller is configured to receive a change of state signal from one of the one or more additional digital signaling devices, and in response is configured to change a position of the switch paddle. In some embodiments, in response to receiving the change of state signal, the printed circuit board controller is configured either to interrupt a magnetic attraction between the first magnet pair if the first receiving magnet is engaged to the first paddle magnet at the time the change of state signal is received by the printed circuit board controller or to interrupt a magnetic attraction between the second magnet pair if the second receiving magnet is engaged to the second paddle magnet at the time the change of state signal is received by the printed circuit board controller. In some embodiments, the magnetic attraction between the first magnet pair is interrupted by turning off the magnetism of the first receiving magnet. In some embodiments, the magnetic attraction between the second magnet pair is interrupted by turning off the magnetism of the second receiving magnet. In some embodiments, the magnetic attraction between the first magnet pair is interrupted by reversing the polarity of the first receiving magnet. In some embodiments, the magnetic attraction between the second magnet pair is interrupted by reversing the polarity of the second receiving magnet. In some embodiments, printed circuit board assembly further comprises a wireless transmitter configured to communicate with a mated wireless receiving electrical control device. In some embodiments, the printed circuit board assembly controller is configured to determine a succession of first and second changes of state within a defined time period, and in response to determining the succession the printed circuit board assembly is further configured to transmit a bi-directional synchronization command via the wireless transmitter to the wireless receiving electrical control device to reestablish synchronization with the wireless receiving electrical control device. In some embodiments, the printed circuit board assembly controller is further configured to determine if the bi-directional synchronization command successfully reestablished synchronization with the wireless receiving electrical control device. In some embodiments, if the bi-directional synchronization command does not successfully reestablish synchronization with the wireless receiving electrical control device, then the printed circuit board assembly controller is further configured to generate a warning signal. In some embodiments, the digital signaling switch is configured to control a receiving electrical control device and to modulate electrical output within or upstream of an end electrical fixture.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a digital signaling device. Those of ordinary skill in the art will realize that the following detailed description of the digital signaling device is illustrative only and is not intended to be in any way limiting. Other embodiments of the digital signaling device will readily suggest themselves to such skilled persons having the benefit of this disclosure.

Reference will now be made in detail to implementations of the digital signaling device as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Although subsequent description is directed to a digital signaling device implemented for controlling a digital light switch, it is understood that the concepts described can be implemented for other applications of the digital signaling device.

Figure 1:
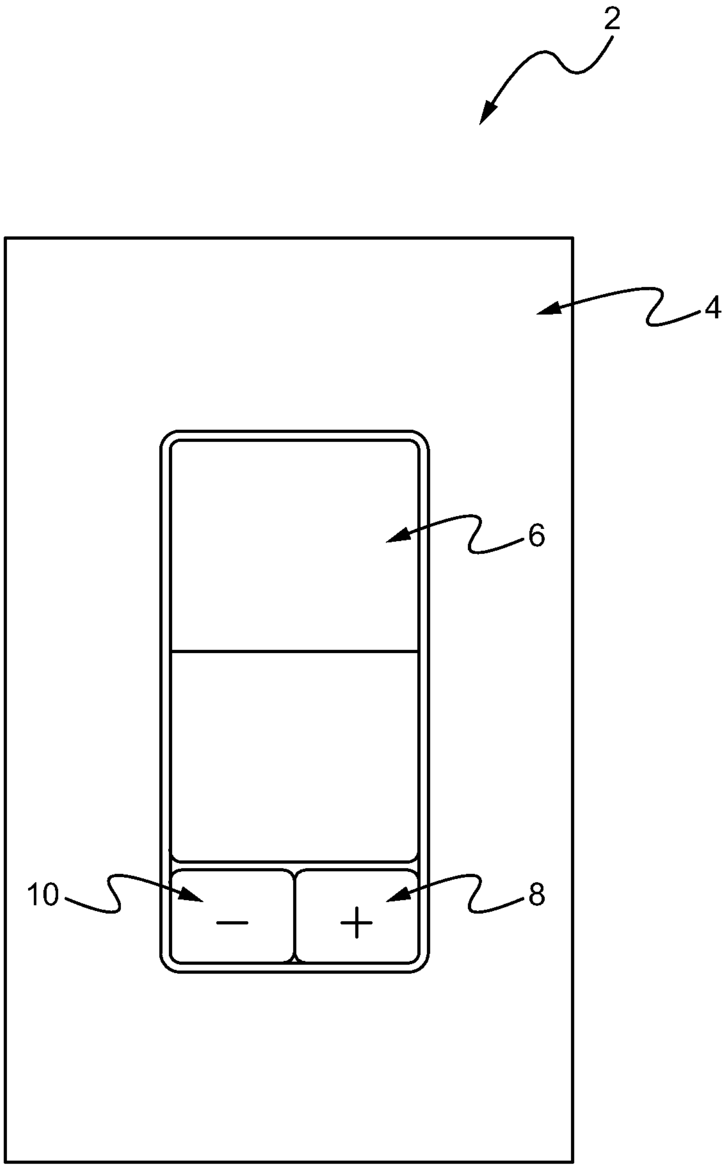
FIG. 1 illustrates a front view of a digital signaling device according to some embodiments.

FIG. 1 illustrates a front view of a digital signaling device according to some embodiments. In the exemplary configuration, the digital signaling device is wall-mounted. The digital signaling device is generally configurable to send a signal (wired or wireless) to a receiving electrical control device which engages and disengages an electrical connection within an electrical circuit. The digital signaling device indirectly engages and disengages the electrical circuit by functioning as a user interface to change a state of an electrical switch that is coupled to the digital signaling device via the receiving electrical control device, and in response to a user input provides control signaling to the receiving electrical control device. In an exemplary application, the digital signaling device is configured to provide control signaling to a digital light switch, which in turn is configured to control the operation of a connected light source. It is understood that the digital signaling device, along with an in-circuit receiving electrical control device, can be used for other applications that utilize an electrical switch. The digital signaling device 2 has user interface elements including a switch paddle 6, a dimmer+button 8 and a dimmer−button 10. The switch paddle 6 toggles back and forth to engage and disengage an electrical connection, for example to turn ON and OFF a connected light source. The dimmer+button 8 and the dimmer−button 10 are used to increase or decrease, respectively, the amount of current that can pass through the switch 2 when engaged. The cover plate 4 is a decorative piece for covering from view the other components of the switch 2.

Figure 2:
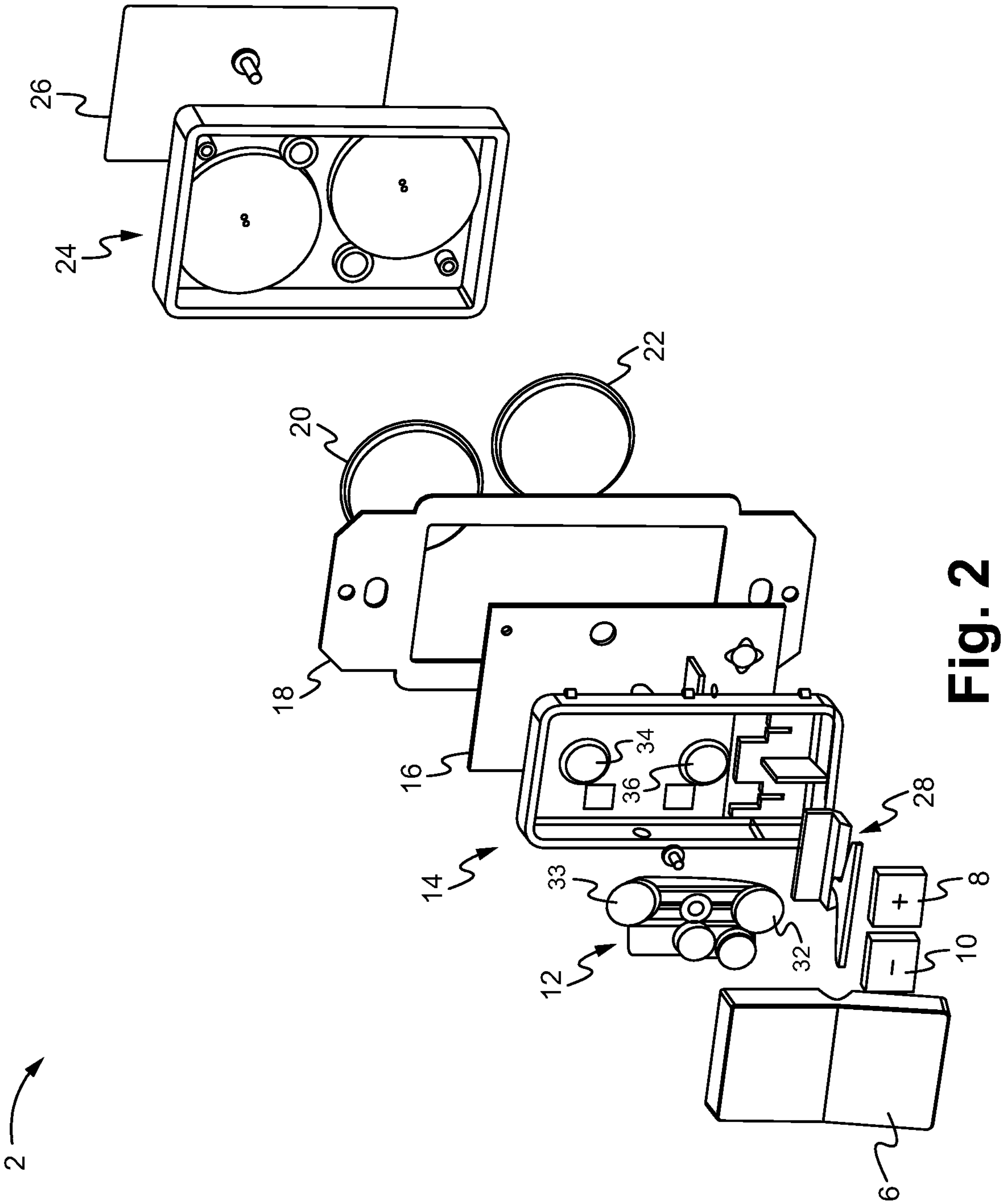
FIG. 2 illustrates an exploded view of the digital signaling device without the cover plate according to some embodiments.

FIG. 2 illustrates an exploded view of the digital signaling device without the cover plate according to some embodiments. The receiving electrical control device 2 includes the switch paddle 6, the dimmer+button 8, the dimmer−button 10, a magnet housing 12, a switch paddle and magnet housing 14, a printed circuit board assembly (PCBA) 16, a mounting bracket 18, a battery 20, a battery 22, a battery housing 24, a removable battery cover plate 26, and a dimmer button support bracket and LED light pipe 28. The magnet housing 12 includes paddle magnets 30 and 32, and the switch paddle and magnet housing 14 includes receiving magnets 34 and 36. The switch paddle and magnet housing 14 also includes structures functioning as switch paddle pivot points. The PCBA 16 includes control, networking, and power circuitry for controlling operation of the digital signaling device 2, receiving and transmitting control signals, and powering the control and networking circuitry. It is understood that the digital signaling device 2 can be alternatively powered. For example, the digital signaling device can be powered by a wired connection to a power source, or an on-board energy harvesting technology can be used, such a phot-voltaic, electro-mechanical, etc.

Figure 3:
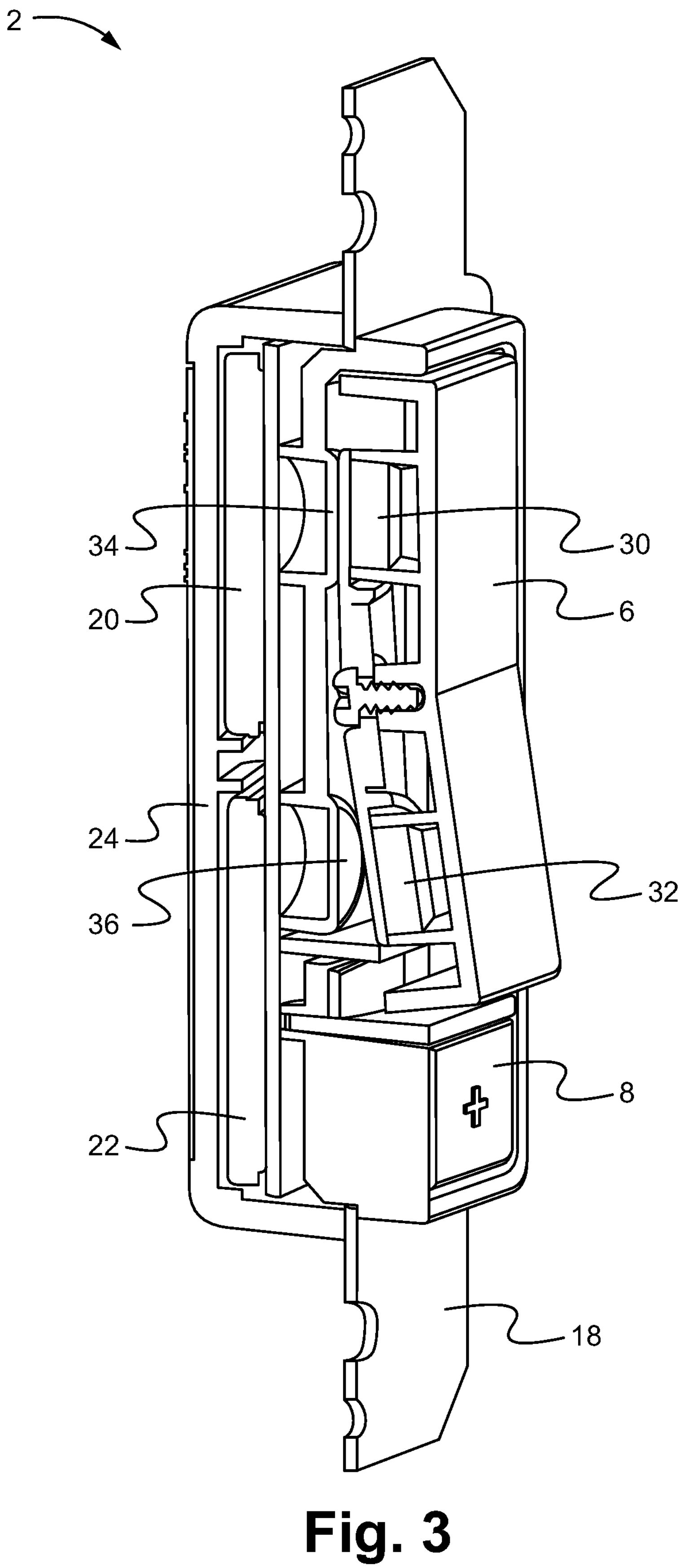
FIG. 3 illustrates a cut out side view of the digital signaling device according to some embodiments.

FIG. 3 illustrates a cut out side view of the digital signaling device according to some embodiments. In operation, the switch paddle 6 pivots between two positions. The position of the switch paddle 6 shown in FIG. 3 is considered a first position. In the first position, the top portion of the switch paddle 6 is pushed inward (toward the wall when wall-mounted) such that the paddle magnet 30 is engaged with the receiving magnet 34. In this first position, the bottom portion of the switch paddle 6 extends outward (away from the wall) such that the paddle magnet 32 is disengaged from the receiving magnet 36. FIG. 1 shows the switch paddle 6 in a second position where the bottom portion of the switch paddle 6 is pushed inward (toward the wall) such that the paddle magnet 32 is engaged with the receiving magnet 36. In this second position, the top portion of the switch paddle 6 extends outward (away from the wall) such that the paddle magnet 30 is disengaged from the receiving magnet 34. In some embodiments, the first position corresponds to an OFF position, i.e. signals to the receiving electrical control device that no current flows through the digital switch, and the second position corresponds to an ON position, i.e. signals to the receiving electrical control device that current flows through the digital switch.

Figure 4:
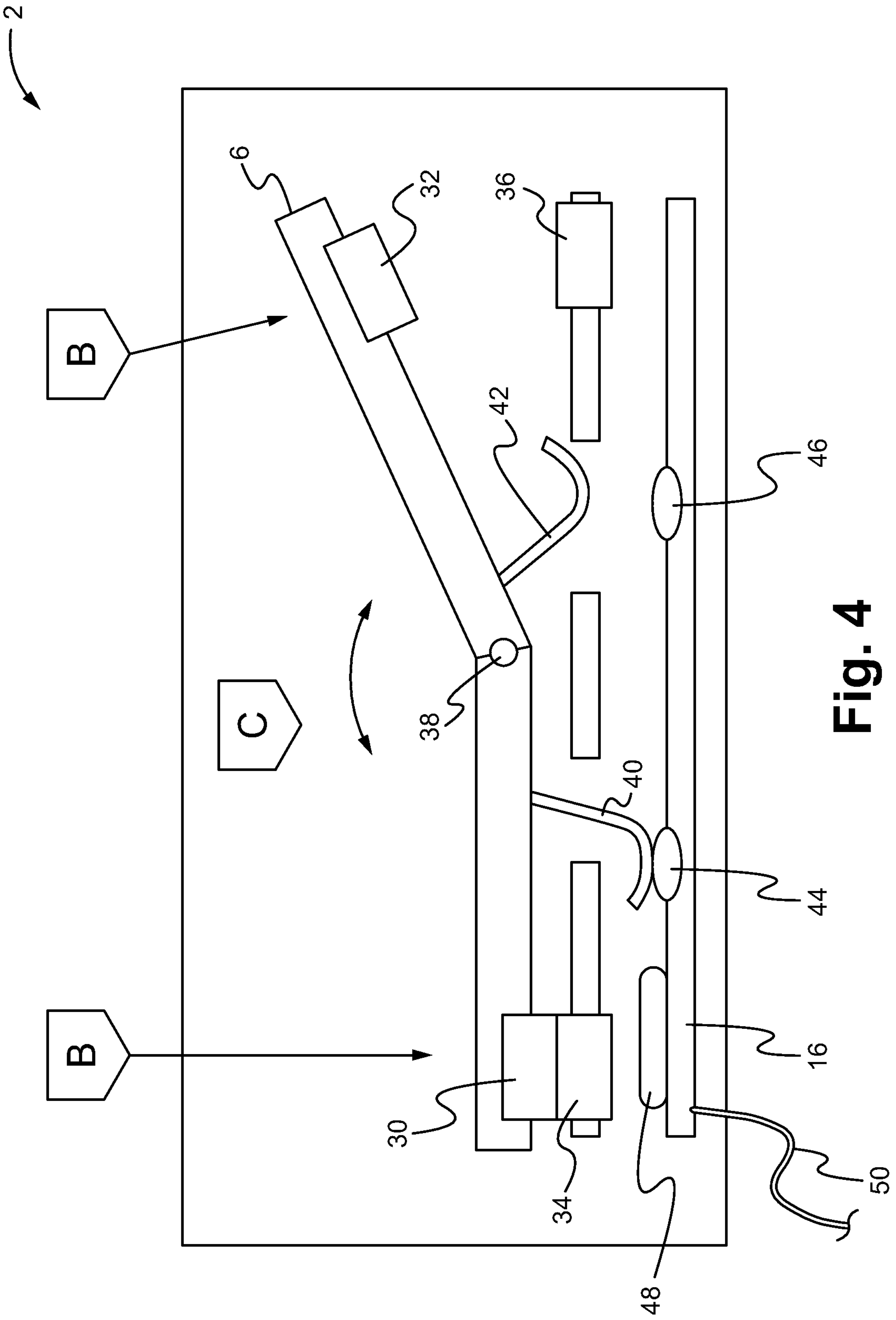
FIG. 4 illustrates a simplified schematic diagram of the digital signaling device of FIG. 3.

In conventional digital switches, contacts used for actuating the digital switch require excessive extra contact pressure which negatively impacts the tactile response. As such, a user may not get a sense of "feel" that the digital switch has been actuated. The digital signaling device described herein uses a low-impact contact sensor, for example a low force spring and a PCBA-mounted dome switch, which does require user force to engage. The magnetic attraction of approaching magnets is sufficient to engage switch contact, not requiring further user interaction. Thus, the operation of the digital signaling device, which "snaps" on with the momentum of closing magnets, closely approximates the feel of an analogue electro-mechanical switch. FIG. 4 illustrates a simplified schematic diagram of the digital signaling device of FIG. 3. The digital signaling device 2 shown in FIG. 4 is simplified to better illustrate the structure and operation. In the example state shown in FIG. 4, the digital signaling device 2 is in an "OFF" state where the magnets 30, 34 are in contact (magnetically locked) and the magnets 32, 36 are separated. In this first position, a force spring 40 has actuated a PCBA contact 44. The force spring 40 is attached to the backside of the paddle switch 6. Actuation of the PCBA contact 44 provides a signal to the PCBA controller to turn OFF the digital switch, in response to which the PCB controller transmits a control signal to turn OFF the digital switch. In some embodiments, the PCBA contact 44 is a PCBA-mounted dome switch. It is understood that other types of conventional digital switch contacts can be used as the PCBA contact. To turn the switch "ON", a user pushes the switch paddle 6 at position [B], which breaks contact of the magnets 30, 34, and pivots [C] the switch paddle 6 at hinge 38 until the paddle magnet 32 contacts (magnetically locks) with the receiving magnet 36. The magnets 32, 36 contact each other with a "click" that is both audible and haptic, which replicates the "feel" of an electro-mechanical decorator-style light switch using electromagnetic elements. Pivoting the switch paddle 6 into this second position moves a force spring 42 against a PCBA contact 46, thereby actuating the PCBA contact 46. The force spring 42 is attached to the backside of the paddle switch 6. Actuation of the PCBA contact 46 provides a signal to the PCBA controller to turn ON the digital switch, in response to which the PCB controller transmits a control signal to turn ON the digital switch. In some embodiments, the PCBA contact 46 is a PCBA-mounted dome switch. It is understood that other types of conventional digital switches can be used as the PCBA contact. To turn the digital signaling device "OFF", a user pushes the switch paddle 6 at position [A], which breaks contact of the magnets 32, 36, and pivots [C] the switch paddle 6 at hinge 38 until the paddle magnet 30 contacts (magnetically locks) with the receiving magnet 34. The magnets 30, 34 contact each other with a "click". Pivoting the switch paddle 6 into this first position moves the force spring against the PCBA contact 44, thereby actuating the PCBA contact 44. The PCBA controller transmits control signals to a coupled receiving electrical control device via either a wireless transmitter 48 or an external wire 50. The receiving electrical control device can also provide electrical dimming control for an end device or lighting fixture through TRIAC, 0-10V, constant current reduction (CCR), or pulse wave modulation (PWM). The receiving electrical control device can be implemented within or upstream of the electrical fixture for modulating electrical output. For example, the receiving electrical control device can be within a light bulb itself, in-line with high voltage circuits in the ceiling (e.g. attached to a fixture box in the ceiling), in-line with Low Voltage DC lighting downstream from a AC/DC transformer, control a ceiling fan in the fan fixture box, or even control a switched electrical outlet.

A three-way switch is a common type of switch that makes it possible to control an electrical fixture, such as a light fixture, from two different locations. In a hallway or large room, for example, installing three-way switches at both ends enables turning ON or OFF of the light fixture from both locations. Typically, the first position provides a visual indicator that the light fixture is OFF and the second position provides a visual indicator that the light fixture is ON. Traditional three-way switches become out of sync with multiple switch interactions; that is, the usual visual indicators that the controlled light fixture is ON or OFF may not be in sync. Similarly, a digital switch with analogue-type operation can become out of sync, both when there is a second physical switch, and when there is control by "smart" enabled devices (occupancy sensors, proximity sensors motion sensors, ambient light sensors, controller hubs, mobile devices, etc.). Many digital switches avoid this problem by not maintaining switch state; that is, they use buttons or neutral rockers. However, these digital switches do not operate like traditional analogue-type switches, and are not desired by some users. In some embodiments, the digital signaling device described herein is further configured to determine a status of the connected downstream electrical fixture, and autonomously change the position of the switch paddle to reflect the state of the controlled electrical fixture. The changing of the switch paddle position is controlled through electromagnetic control of the attractive magnets. Controlling the switch paddle position in this manner provides automated three-way paddle operation and synchronization.

An automated three-way paddle operation and synchronization is described in reference to FIG. 4. The PCBA controller on the PCBA 16 receives a signal via the wireless transmitter 48 or the external wired 50 that the state of the controlled electrical fixture, for example a light, fan, speaker, etc, has changed by another switching source (such as another three-way physical switch, or by virtual control through mobile application or hub controller, through an automated sensor switching routine (for example, an occupancy sensor, proximity sensor, motion sensor, ambient light sensor)) or timing mechanism, etc. The physical visual indicator of the switch paddle on the digital signaling device is now out of sync with the state of the electrical fixture; that is, typically the switch paddle 6 is in the first position (FIG. 4) when the electrical fixture is OFF, but now the electrical fixture has been turned ON by the other switching source. The position of the switch paddle 6, which many use as a visual indicator of state, is out of sync with the state of the electrical fixture. To initiate an automated physical change of the switch paddle state, the PCBA controller interrupts the magnetic attraction between the engaged paddle magnet 30 and engaged receiving magnet 34 by either turning off the magnetism of the receiving magnetic 34 or reversing the polarity of the receiving magnet 34. In some embodiments, each of the receiving magnets 34, 36 are electro-magnetic. The magnetic field of each of the receiving magnets is maintained through application of a current, which is controlled by electronics on the PCBA 16. To turn off the magnetism of one of the receiving magnets, the current to that receiving magnet is turned off. When the paddle magnet 30 and the receiving magnet 34 are engaged, the force spring 40 is maintained in a flexed position by the engaged magnets. In the case of turning off the magnetism of the receiving magnet 34, when the magnetism is turned off the force flexing the force spring 40 is removed and the force spring 40, and/or a secondary force spring (not shown), initiates switch paddle rotational operation [C] about the hinge 38, which disengages the force spring 40 from the engaged PCBA contact 44 and rotates paddle magnet 32 toward the receiving magnet 36. To reverse the polarity of one of the receiving magnets, the current direction is switched, which is controlled by electronics on the PCBA 16. In the case wherein the polarity of the receiving magnet 34 is reversed, the force spring 40 and the now repulsive magnetic force between the paddle magnet 30 and the receiving magnet 34, initiates switch paddle rotational operation [C] about the hinge 38. As the un-engaged paddle magnet 32 and the receiving magnet 36 come into proximity, their magnetic attraction pulls the switch paddle 6 into the engaged state where the paddle magnet 32 and the receiving magnet 36 "click" together. The formerly unengaged force spring 42 engages the formerly unengaged PCBA contact 46, signaling to the PCBA controller that the switch paddle state has changed. The PCBA controller then re-engages the original magnetic state of the now unengaged receiving magnet 34. A similar procedure is performed to automate the switch paddle state from the second position to the first position by either turning off the magnetism of the receiving magnetic 36 or reversing the polarity of the receiving magnet 36. In this manner, both three-way switches can be automatically controlled to be in the first position when the electrical fixture is OFF and in the second position when the electrical fixture is ON. This concept can be similarly applied to an N-way switching system that includes N digital signaling devices.

In some instances, wireless digital signaling devices may become "un-paired" from their mated receiving electrical control devices. Many of these wireless digital signaling devices, operating in a low power mode, may not realize that the pairing has been lost, as the timing of bi-direction syncing to the receiving electrical control device is either non-existent or of low frequency. Upon the loss of pairing, the wireless digital signaling device is effectively inoperable. Unfortunately, if the light, or similar controlled electrical fixture, does not turn ON, the user is unable to discern if the problem is due to the pairing failure, or some other failure, such as the electrical fixture itself (for example, a light bulb is burnt out). Usually, upon finding the controlled electrical fixture is not working, the user will flip the switch paddle ON and OFF in quick succession to elicit a response from the electrical fixture. If the wireless digital signaling device finds the user making rapid toggling of the switch paddle, the PCB controller on the wireless digital signaling device itself initiates a bi-directional sync. If the bi-directional sync operation fails, the PCB controller sends out a warning message to the user (for example, flashing an LED, or sending a message relayed through other connected devices such as connected mobile phones). If the bi-directional sync is successful, the PCB controller ignores the continued input as the problem does not lie with the wireless digital signaling device.

A bi-directional synchronization operation is described in reference to FIG. 4. The PCBA controller receives a signal from the PCBA contacts 44, 46 that the switch paddle 6 is being flipped ON and OFF multiple times in quick succession. This may be indicative that the controlled electrical fixture is not operating as expected to the user. As well as continuing normal control operation, the PCBA controller sends out a bi-direction sync command to the mated receiving electrical control device through the wireless transmitter 48. As the switch paddle 6 is repeatedly flipped ON and OFF, the PCB controller sends out a command to re-pair, which is a universal command (i.e. the digital signaling device and the receiving electrical control device don't have to be paired to receive this message). If the receiving electrical control device and the digital signaling device are still paired, the receiving electrical control device ignores the re-pairing command. If the digital signaling device is truly un-paired with the receiving electrical device, the receiving electrical device takes the re-pair command and bi-directionally sends back its pairing key that it has stored in memory. If the key of the digital signaling device matches the key of the receiving electrical control device, then the two devices are re-synced (re-paired). Each sends its confirmation to the other. If the bi-directional synchronization is successful, the digital signaling device continues in normal operation. If the bi-directional synchronization is unsuccessful, the digital signaling device sends a warning message, such as illuminating an LED on or connected to the PCBA 16 and/or to other attached system devices via wired or wireless communications.

The present application has been described in terms of specific embodiments incorporating details to facilitate the understanding of the principles of construction and operation of the digital switch. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A digital signaling device comprising:

a switch paddle comprising a first portion and a second portion, wherein the switch paddle is rotatable between a first position and a second position;

a first magnet pair comprising a first receiving magnet fixed in position and a first paddle magnet attached to the first portion of the switch paddle, wherein when the switch paddle rotates to the first position, the first receiving magnet mechanically and electro-magnetically engages with the first paddle magnet with a first audible indicator and a first haptic indicator, and the switch paddle maintains the first position;

a second magnet pair comprising a second receiving magnet fixed in position and a second paddle magnet attached to the second portion of the switch paddle, wherein when the switch paddle rotates to the second position, the second receiving magnet mechanically and electro-magnetically engages with the second paddle magnet with a second audible indicator and a second haptic indicator, and the switch paddle maintains the second position;

a first force spring coupled to the first portion of the switch paddle;

a second force spring coupled to the second portion of the switch; and a printed circuit board assembly comprising a printed circuit board assembly controller, a first printed circuit board assembly contact, and a second printed circuit board assembly contact, wherein the first printed circuit board assembly contact and the first force spring form a first digital switching mechanism that are engaged when the switch paddle is in the first position and when engaged signal the printed circuit board assembly controller of a first change of state of the digital signaling device, and the second printed circuit board assembly contact and the second force spring form a second digital switching mechanism that are engaged when the switch paddle is in the first position and when engaged signal the printed circuit board assembly controller of a second change of state of the digital signaling device.

2. The digital signaling device of claim 1, wherein the first position of the switch paddle provides a first visual indicator of a state of the digital switch, and wherein the second position of the switch paddle provides a second visual indicator of another state of the digital switch.

3. The digital signaling device of claim 1, wherein the first printed circuit board assembly contact comprises a first printed circuit board assembly dome switch, and wherein the second printed circuit board assembly contact comprises a second printed circuit board assembly dome switch.

4. The digital signaling device of claim 1, wherein when the switch paddle is in the first position, the second receiving magnet and the second paddle magnet are disengaged, and the second force spring and the second printed circuit board assembly contact are disengaged.

5. The digital signaling device of claim 1, wherein when the switch paddle is in the second position, the first receiving magnet and the first paddle magnet are disengaged, and the first force spring and the first printed circuit board assembly contact are disengaged.

6. The digital signaling device of claim 1, wherein the digital switch is powered by one or more batteries, a wired connection to a power source, or an energy harvesting device.

7. The digital signaling device of claim 1, wherein the digital signaling device is part of a N-way switching system for controlling the electrical fixture, wherein the N-way switching system further comprises one or more additional digital signaling devices, and wherein the printed circuit board assembly controller is configured to receive a change of state signal from one of the one or more additional digital signaling devices, and in response is configured to change a position of the switch paddle.

8. The digital signaling device of claim 7, wherein in response to receiving the change of state signal, the printed circuit board assembly controller is further configured either to interrupt a magnetic attraction between the first magnet pair if the first receiving magnet is engaged to the first paddle magnet at the time the change of state signal is received by the printed circuit board assembly controller or to interrupt a magnetic attraction between the second magnet pair if the second receiving magnet is engaged to the second paddle magnet at the time the change of state signal is received by the printed circuit board assembly controller.

9. The digital signaling device of claim 8, wherein the magnetic attraction between the first magnet pair is interrupted by turning off magnetism of the first receiving magnet.

10. The digital signaling device of claim 8, wherein the magnetic attraction between the second magnet pair is interrupted by turning off magnetism of the second receiving magnet.

11. The digital signaling device of claim 8, wherein the magnetic attraction between the first magnet pair is interrupted by reversing polarity of the first receiving magnet.

12. The digital signaling device of claim 8, wherein the magnetic attraction between the second magnet pair is interrupted by reversing polarity of the second receiving magnet.

13. The digital signaling device of claim 1, wherein printed circuit board assembly further comprises a wireless transmitter configured to communicate with a mated wireless receiving electrical control device.

14. The digital signaling device of claim 13, wherein the printed circuit board assembly controller is configured to determine a succession of first and second changes of state within a defined time period, and in response to determining the succession the printed circuit board assembly is further configured to transmit a bi-directional synchronization command via the wireless transmitter to the wireless receiving electrical control device to reestablish synchronization with the wireless receiving electrical control device.

15. The digital signaling device of claim 14, wherein the printed circuit board assembly controller is further configured to determine if the bi-directional synchronization command successfully reestablished synchronization with the wireless receiving electrical control device.

16. The digital signaling device of claim 15, wherein if the bi-directional synchronization command does not successfully reestablish synchronization with the wireless receiving electrical control device, then the printed circuit board assembly controller is further configured to generate a warning signal.

17. The digital signaling device of claim 1, wherein the digital signaling switch is configured to control a receiving electrical control device and to modulate electrical output within or upstream of an end electrical fixture.

18. A digital signaling device comprising:

a switch paddle comprising a first portion and a second portion, wherein the switch paddle is rotatable between a first position and a second position;

a first magnet pair comprising a first receiving magnet fixed in position and a first paddle magnet attached to the first portion of the switch paddle, wherein when the switch paddle rotates to the first position, the first receiving magnet engages with the first paddle magnet with a first audible indicator and a first haptic indicator, and the switch paddle maintains the first position;

a second magnet pair comprising a second receiving magnet fixed in position and a second paddle magnet attached to the second portion of the switch paddle, wherein when the switch paddle rotates to the second position, the second receiving magnet engages with the second paddle magnet with a second audible indicator and a second haptic indicator, and the switch paddle maintains the second position;

a first force spring fixedly coupled to the first portion of the switch paddle;

a second force spring fixedly coupled to the second portion of the switch paddle; and a printed circuit board assembly comprising a printed circuit board assembly controller, a first printed circuit board assembly contact, and a second printed circuit board assembly contact, wherein the first printed circuit board assembly contact and the first force spring form a first digital switching mechanism that are engaged when the switch paddle is in the first position and when engaged signal the printed circuit board assembly controller of a first change of state of the digital signaling device, and the second printed circuit board assembly contact and the second force spring form a second digital switching mechanism that are engaged when the switch paddle is in the first position and when engaged signal the printed circuit board assembly controller of a second change of state of the digital signaling device.

19. A digital signaling device comprising:

a switch paddle comprising a first portion and a second portion, wherein the switch paddle is rotatable between a first position and a second position;

a first magnet pair comprising a first receiving magnet fixed in position and a first paddle magnet attached to the first portion of the switch paddle, wherein when the switch paddle rotates to the first position, the first receiving magnet engages with the first paddle magnet with a first audible indicator and a first haptic indicator, and the switch paddle maintains the first position;

a second magnet pair comprising a second receiving magnet fixed in position and a second paddle magnet attached to the second portion of the switch paddle, wherein when the switch paddle rotates to the second position, the second receiving magnet engages with the second paddle magnet with a second audible indicator and a second haptic indicator, and the switch paddle maintains the second position;

a first force spring coupled to the first portion of the switch paddle;

a second force spring coupled to the second portion of the switch paddle; and a printed circuit board assembly (PCBA) comprising a PCBA controller, a first PCBA contact, and a second PCBA contact, wherein in the first position, the first force spring is urged against the first PCBA contact, thereby providing a signal to the PCBA controller of a first change of state of the digital signaling device, and in the second position, the second force spring is urged against the second PCBA contact, thereby providing a signal to the PCBA controller of a second change of state of the digital signaling device.

20. The digital signaling device of claim 19, wherein the first PCBA contact comprises a first PCBA dome switch, and the second PCBA contact comprises a second PCBA dome switch.

* * * * *